(12) United States Patent
Bhogal et al.

(10) Patent No.: US 8,041,614 B2
(45) Date of Patent: Oct. 18, 2011

(54) INVENTORY ITEM EXPIRATION AND RENEWAL IN A VIRTUAL UNIVERSE

(75) Inventors: Kulvir S. Bhogal, Fort Worth, TX (US); Rick A. Hamilton, II, Charlottesville, VA (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 12/203,952

(22) Filed: Sep. 4, 2008

(65) Prior Publication Data

US 2010/0057591 A1   Mar. 4, 2010

(51) Int. Cl.
*G06Q 10/00* (2006.01)
(52) U.S. Cl. ............... 705/28; 705/52; 463/42; 715/757
(58) Field of Classification Search ........................ None
See application file for complete search history.

(56) References Cited

U.S. PATENT DOCUMENTS

| | | | |
|---|---|---|---|
| 6,449,518 B1* | 9/2002 | Yokoo et al. | 700/86 |
| 2005/0021472 A1* | 1/2005 | Gettman et al. | 705/52 |
| 2007/0026942 A1* | 2/2007 | Kinsley et al. | 463/29 |
| 2007/0066400 A1* | 3/2007 | Kogo | 463/42 |
| 2007/0265969 A1* | 11/2007 | Horwat et al. | 705/51 |
| 2008/0207327 A1* | 8/2008 | Van Luchene et al. | 463/42 |
| 2008/0263460 A1* | 10/2008 | Altberg et al. | 715/757 |
| 2009/0083192 A1* | 3/2009 | Bokor et al. | 705/80 |

* cited by examiner

*Primary Examiner* — Luna Champagne
(74) *Attorney, Agent, or Firm* — William Schiesser; Hoffman Warnick LLC

(57) ABSTRACT

The present invention relates to inventory item expiration and renewal in a virtual universe. A method for in accordance with an embodiment of the present invention provides at least one item in the inventory of an avatar with metadata specifying whether the item must be renewed and how often. Instructions are obtained regarding a renewal of the item and the item is renewed based on the instructions.

23 Claims, 2 Drawing Sheets

INVENTORY ITEM EXPIRATION AND RENEWAL IN A VIRTUAL UNIVERSE

FIELD OF THE INVENTION

The present invention relates to a virtual universe, and more specifically relates to inventory item expiration and renewal in a virtual universe.

BACKGROUND OF THE INVENTION

A virtual universe is an interactive simulated environment accessed by multiple users through an online interface. Users inhabit and interact in the virtual universe via avatars, which are two or three-dimensional graphical representations of humanoids. There are many different types of virtual universes, however there are several features many virtual universes generally have in common:
A) Shared Space: the virtual universe allows many users to participate at once.
B) Graphical User Interface: the virtual universe depicts space visually, ranging in style from 2D "cartoon" imagery to more immersive 3D environments.
C) Immediacy: interaction takes place in real time.
D) Interactivity: the virtual universe allows users to alter, develop, build, or submit customized content.
E) Persistence: the virtual universe's existence continues regardless of whether individual users are logged in.
F) Socialization/Community: the virtual universe allows and encourages the formation of social groups such as teams, guilds, clubs, cliques, housemates, neighborhoods, etc.

An avatar can have a wide range of business and social experiences. Such business and social experiences are becoming more common and increasingly important in on-line virtual universes, such as that provided in the on-line world Second Life (Second Life is a trademark of Linden Research in the United States, other countries, or both). The Second Life client program provides its users (referred to as residents) with tools to view, navigate, and modify the Second Life world and participate in it's virtual economy.

Second Life and other on-line virtual universes present a tremendous new outlet for both structured and unstructured virtual collaboration, gaming and exploration, as well as real-life simulations in virtual spaces. These activities, along with yet to be disclosed new dimensions, in turn provide a wide open arena for creative and new business interactions, methods and mechanisms.

Inventory items are used to enhance a user's virtual life, allowing them, for example, to impress others or conduct business. An avatar can store personal and decorative software items such as clothing, accessories, or pets. Additionally, an avatar may store software for performing certain tasks such as playing music, decrypting documents that are received, etc., or store software tokens permitting access to certain areas within the virtual universe (e.g., a weeklong pass to an ongoing, virtual universe event). These inventory items can be bought, sold, traded, or given away to others, and can be modifiable by the user, or locked by the supplier to prevent modification or copying.

SUMMARY OF THE INVENTION

The present invention is directed to inventory item expiration and renewal in a virtual universe. More specifically, the present invention provides a methodology for dynamically managing the renewal, update, and usage of inventory items using communication signaling.

A first aspect of the present invention is directed to a method for dynamically managing items in an inventory in a virtual universe, comprising: providing at least one item in the inventory of an avatar with metadata specifying whether the item must be renewed and, if so, how often; if the item must be renewed, obtaining instructions regarding a renewal of the item; and renewing the item based on the instructions.

A second aspect of the present invention is directed to a system for dynamically managing items in an inventory in a virtual universe, comprising: at least one computer, including: a system for providing at least one item in the inventory of an avatar with metadata specifying whether the item must be renewed and, if so, how often; a system for obtaining instructions regarding a renewal of the item; and a system for renewing the item based on the instructions.

A third aspect of the present invention is directed to a program product stored on a computer readable medium, which when executed, dynamically manages items in an inventory in a virtual universe, the computer readable medium comprising program code for: providing at least one item in the inventory of an avatar with metadata specifying whether the item must be renewed and, if so, how often; obtaining instructions regarding a renewal of the item; and renewing the item based on the instructions.

A fourth aspect of the present invention is directed to a method for deploying an application for dynamically managing items in an inventory in a virtual universe, comprising: providing a computer infrastructure being operable to: provide at least one item in the inventory of an avatar with metadata specifying whether the item must be renewed and, if so, how often; obtain instructions regarding a renewal of the item; and renew the item based on the instructions The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
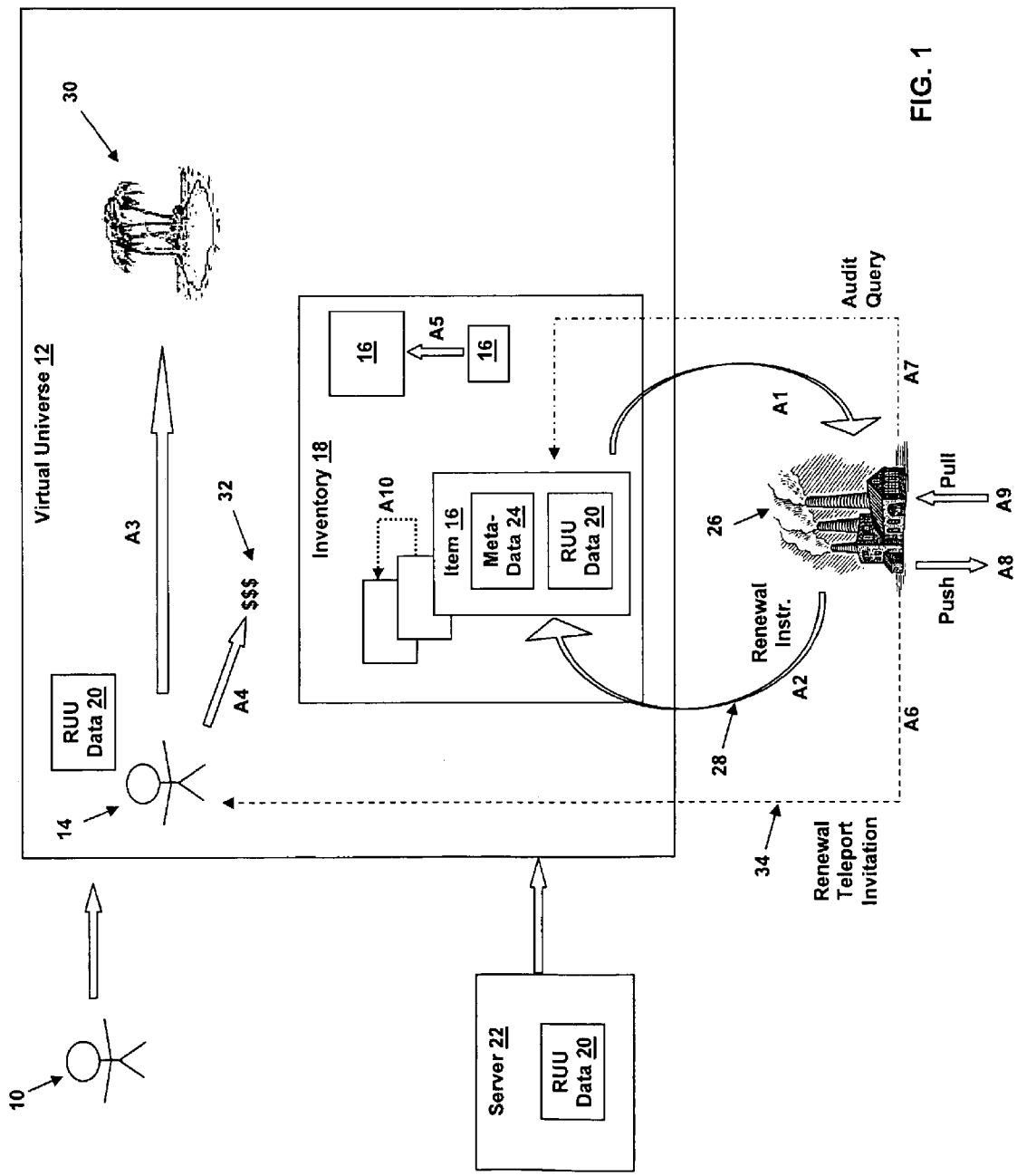
FIG. 1 depicts an illustrative system for dynamically managing inventory items in a virtual universe using communication signaling, in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to inventory item expiration and renewal in a virtual universe.

FIG. 1 depicts an illustrative system for dynamically managing inventory items in a virtual universe using communication signaling, in accordance with an embodiment of the present invention. As shown, a user 10 interacts in a virtual universe 12 via an avatar 14. The avatar 14 stores items 16 in an inventory 18. The items 16 can be static (i.e., the items do not change) or non-static (i.e., the items must be renewed or updated).

Virtual universe users typically have an inventory of items that they own, and these inventory items may be bought, sold, traded, etc., during operation of the virtual universe. Items in a typical inventory may include clothing, virtual pets, vehicles, electronic media (e.g., music files), or other possessions. Each inventory item may represent a piece of code or other data which may be rendered in some fashion to the user during a session in the virtual universe. Clothing inventory, for example, may be rendered as clothing for the user's avatar while a virtual dog, in another example, may render as an automated avatar that follows the user's avatar within the virtual universe. The contents of a user's inventory are typically displayed in a hierarchical manner similar to an operating system's display of folders, subfolders, and files within a filesystem.

Inventory items may be any item that may be associated with a user in a virtual universe. Inventory items may each be composed of one or more files, be part of a larger database, or be stored in any other fashion. In some embodiments, an inventory item may be a piece of software code that is renderable in a virtual universe. In other embodiments, inventory items may be represented as non-executable data that may be used by the virtual universe to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a virtual universe.

The present invention is directed to the renewal, update, and usage of the items 16 in the inventory 18 of the avatar 14. Renewal, update and/or usage (RUU) data 20 can be stored with the avatar 14, with a given item 16 in the inventory 18 of the avatar 14, at a central server 22, and/or at any other suitable source. Any of these sources can initiate the communication signaling.

The present invention comprises some or all of the following:
 (a) Item metadata (e.g., renewal date, price);
 (b) Renewal methods (e.g., teleport, self-renewal);
 (c) Renewal notification (e.g., changing appearance, email usage, chat usage);
 (d) Storage and transmission of item renewal, update, and usage data;
 (e) Push/pull/peer-to-peer communications;
 (f) Subscriptions for acquiring or updating items; and
 (g) Inventory signaling restriction characteristics (e.g., public, private, shared).

Each of the above features are described in greater detail below.

Item Metadata

Each item 16 in the inventory 18 of the avatar 14 may contain metadata 24 that specifies whether the item 16 must be renewed and how often. The item 16 may contact (A1) the supplier/manufacturer 26 (e.g., a source) of the item 16 in order to obtain instructions 28 (A2) regarding the renewal process for the item 16 (e.g., renewal via avatar 14 teleport). The metadata 24 can also include different renewal options, such as prices for weekly, monthly or annual renewal.

Renewal Methods

Non-static items 16 in the inventory 18 of the avatar 14 can expire, but may be renewed in several ways including, for example, teleporting (A3) to a predetermined location 30 within the virtual universe 12 and/or paying (A4) an update fee 32. Renewal by means of teleportation can include, for example, teleporting to the location (e.g., store) where the avatar 14 purchased/obtained the item 16, teleporting to a landmark of the supplier/manufacturer of the item 16 in the virtual universe 12, and/or teleporting to a region or island in the virtual universe 12 (e.g., a region or island owned by the supplier/manufacturer of the item 16).

Renewal Notification

To remind the avatar 14 that a non-static item 16 must be renewed, the item 16 may change (A5) graphical characteristics (color, shape, etc.), and/or a renewal teleport invitation 34 can be sent (A6) (e.g., from the supplier/manufacturer 26 of the item 16) to the avatar 14 with a picture of the item 16 on the teleport invitation 34. In response to the renewal teleport invitation 34, the avatar 14 can teleport (A3) to a predetermined location 30 within the virtual universe 12 and/or pay (A4) an update fee 32. In the case of a "try before you buy" offer, the item 16 can notify the avatar 14 at the end of the trial period that a purchase is required.

Storage and Transmission of Item Renewal, Update, and Usage Data

Item renewal, update, and usage (RUU) data 20 may contain various kinds of information, including, for example:
 (a) How often the item 16 has been used or removed from the inventory 18 of the avatar 14;
 (b) All of the locations in which the item 16 has been used;
 (c) Any modifications made by the user 10 and/or avatar 14 to the item 16; and
 (d) Other items 16 in the inventory 18 of the avatar 14 the item 16 has been used with (e.g., which shoes are usually worn with a particular pair of pants).

The supplier/manufacturer 26 of the item 16 can query (A7) the item 16 at any time to "audit" its usage. This can include, for example, checking to see if the item 16 is being used in a prohibited area or in any manner outside the terms of its purchase, borrow, or rental agreement. Periodic and/or real-time audit information about the use of the item 16 enables the supplier, manufacture, and/or marketer of the item 16 to, for example, make specific recommendations of additional products that may be of interest to a particular avatar or groups of avatars. It also enables compensation or charging for the use of particular inventory items.

PushPull/Peer-to-Peer Communications

The ability to receive updates to purchased items is beneficial. If an avatar 14 purchases a car object, they may want to be notified when additional features are added to the car, the body style is updated, or other improvements are made. An item 16 in the inventory 18 of the avatar 14 can be configured to notify the avatar 14 of updates available to the item 16, or automatically retrieve updates. The purchase price of the item 16 can include all maintenance on the item 16 for its lifetime or for a specific period of time.

The present invention can work in either a "push" or "pull" method between the item 16 and the supplier/manufacturer 26 of the item 16. In the "push" scenario, the item 16 is registered with the supplier/manufacturer 26, which can send (A8) messages to the item 16 either periodically or whenever renewals or updates are available. In the "pull" scenario, the item 16 can contact (A9) the supplier/manufactuer 26 at any time to inquire if updates or renewals are available.

Items 16 in the inventory 18 can also communicate in a peer-to-peer fashion (A10). For example, assume that a first avatar has an item and that the first avatar has created a similar item for a second avatar. If the first avatar makes a modification to their version of the item, the modified item can directly notify the similar item that a change has been made.

Item 16 signaling may take place at regular intervals or on an ad-hoc basis. This allows the supplier/manufacturer 26 of the item 16 to track usage (including location) even before the renewal date is reached.

Subscriptions for Acquiring or Updating Items

The avatar 14 can sign up for a subscription of items 16, which would cause the items 16 and/or updates to the items 16 to be automatically downloaded to the inventory 18. For example, the avatar 14 can subscribe to a service that automatically downloads the five currently most popular shirts to their inventory 18 each month.

Inventory Signaling Restrictions

The authorization of communication allowed to or from an item 16 in the inventory 18 of an avatar 14 can be limited based on the items's restriction characteristics, such as public, private, or shared. For example, private items 16 can only be seen by the avatar 14 and no signaling is allowed. Public items 16 can be viewed and signalled by all avatars 14. Shared items 16 can only be seen and signalled by designated avatars 14 (e.g., individually designated or members of a particular group). This prevents unauthorized signalling or monitoring of items 16.

The present invention greatly enhances the commercial and social capabilities of the inventory of an avatar. Enabling management of inventory item renewals increases pricing and sales options for commerce within a virtual universe.

Figure 2:
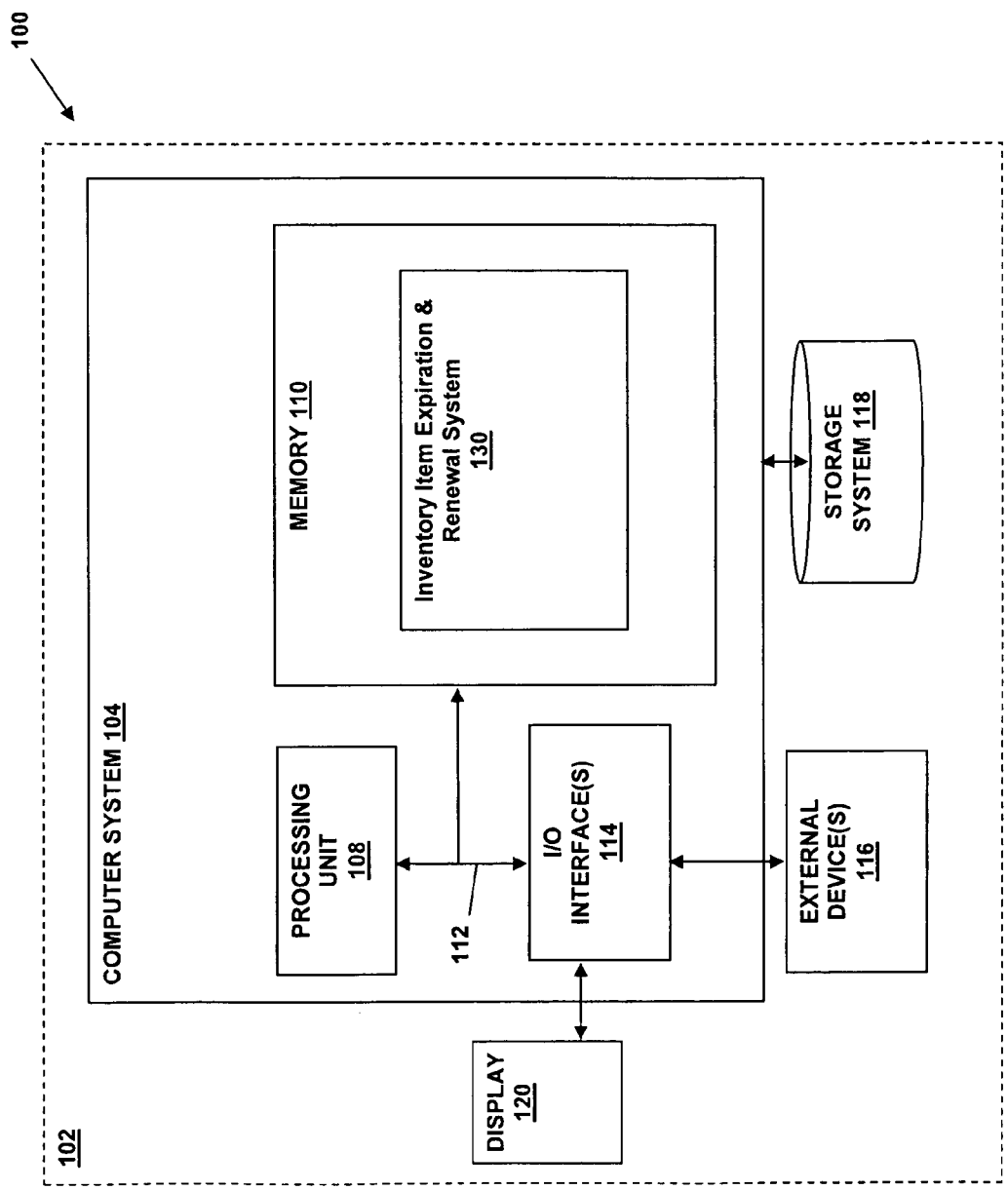
FIG. 2 depicts an illustrative computer system for implementing embodiment(s) of the present invention.

FIG. 2 depicts an illustrative system 100 for inventory item expiration and renewal, in accordance with an embodiment of the present invention. The system 100 includes a computer infrastructure 102 that can perform the various processes described herein. The computer infrastructure 102 is shown including a computer system 104.

The computer system 104 is shown as including a processing unit 108, a memory 110, at least one input/output (I/O) interface 114, and a bus 112. Further, the computer system 104 is shown in communication with at least one external device 116 and a storage system 118. In general, the processing unit 108 executes computer program code, such as inventory item expiration and renewal system 130, that is stored in memory 110 and/or storage system 118, and which is configured to implement any/all processes provided by the present invention. While executing computer program code, the processing unit 108 can read and/or write data from/to the memory 110, storage system 118, and/or I/O interface(s) 114. Bus 112 provides a communication link between each of the components in the computer system 104. The external device(s) 116 can comprise any device (e.g., display 120) that enables a user to interact with the computer system 104 or any device that enables the computer system 104 to communicate with one or more other computer systems.

The computer system 104 can comprise any general purpose computing article of manufacture capable of executing computer program code installed by a user (e.g., a personal computer, server, handheld device, etc.). However, it is understood that the computer system 104 is only representative of various possible computer systems that may perform the various processes of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the present invention. For example, in an embodiment, the computer infrastructure 102 comprises two or more computer systems (e.g., a server cluster) that communicate over any type of wired and/or wireless communications link, such as a network, a shared memory, or the like, to perform the various processes of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

It is understood that some of the various systems shown in FIG. 2 can be implemented independently, combined, and/or stored in memory for one or more separate computer systems that communicate over a network. Further, it is understood that some of the systems and/or functionality may not be implemented, or additional systems and/or functionality may be included as part of the system 100.

It is understood that the invention further provides various alternative embodiments. For example, in an embodiment, the invention provides a computer-readable medium that includes computer program code to enable a computer infrastructure to carry out and/or implement the various processes of the present invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as the memory 110 and/or storage system 118 (e.g., a fixed disk, a read-only memory, a random access memory, a cache memory, etc.).

In another embodiment, the invention provides a business method that performs the processes of the invention on a subscription, advertising, and/or fee basis. A service provider can create, maintain, support, etc., a computer infrastructure, such as the computer infrastructure 102, that performs the processes of the invention for one or more customers. In return, the service provider can receive payment from the customer(s) under a subscription and/or fee agreement and/or the service provider can receive payment from the sale of advertising space to one or more third parties.

In still another embodiment, a computer infrastructure, such as the computer infrastructure 102, can be obtained (e.g., created, maintained, having made available to, etc.) and one or more systems for performing the processes of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the processes of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. The program code can be embodied as one or more types of program products, such as an application/software program, component software/a library of functions, an operating system, a basic I/O system/driver for a particular computing and/or I/O device, and the like.

The foregoing description of the embodiments of this invention has been presented for purposes of illustration and description. It is not intended to be exhaustive or to limit the invention to the precise form disclosed, and obviously, many modifications and variations are possible.

What is claimed is:

1. A method for dynamically managing non-static items in an inventory in a virtual universe, comprising:
providing, using at least one computer device, at least one non-static item in the inventory of an avatar with metadata specifying that the non-static item must be renewed and the frequency of renewal, wherein the avatar is a graphical representation of a humanoid in the virtual universe, and wherein the non-static item is a virtual possession of the avatar;
obtaining instructions using the at least one computer hardware device regarding a renewal of the non-static item, wherein the non-static item is registered with a source of the non-static item and the non-static item contacts the source to obtain the instructions, wherein the source is a supplier/manufacturer within the virtual universe, wherein the virtual universe is an interactive simulated environment accessed by multiple users through an online interface;
sending a message regarding the renewal of the non-static item from the source to the non-static item; and
renewing the non-static item based on the instructions using at least one computer device.

2. The method of claim 1, wherein obtaining instructions further comprises:
the source of the non-static item querying the non-static item to audit a usage of the non-static item.

3. The method of claim 2, further comprising:
determining that the non-static item is being used in at least one of a prohibited area or a manner outside a term of use for the non-static item; and
providing the determination to the source of the non-static item.

4. The method of claim 2, further comprising:
recommending additional items to the avatar in response to the audit.

5. The method of claim 2, further comprising:
charging the avatar for non-static item use in response to the audit.

6. The method of claim 1, wherein renewing the non-static item further comprises:
the avatar teleporting to a predetermined location in the virtual universe; and
renewing the non-static item at the predetermined location.

7. The method of claim 6, wherein the predetermined location comprises at least one of: a purchase location in the virtual universe; a landmark of the source of the non-static item in the virtual universe; or a region or island in the virtual universe.

8. The method of claim 1, wherein renewing the non-static item further comprises:
paying a renewal fee.

9. The method of claim 1, further comprising:
providing a reminder regarding the renewal of the non-static item.

10. The method of claim 9, wherein the reminder further comprises at least one of changing a graphical characteristic of the non-static item or sending a teleport invitation from the source of the non-static item to the avatar.

11. The method of claim 1, further comprising:
providing non-static item renewal, update, and usage data for the non-static item.

12. The method of claim 11, wherein the non-static item renewal, update, and usage data comprises at least one of: how often the non-static item has been used or removed from the inventory; all locations in which the non-static item has been used; any modifications made to the non-static item; or other items in the inventory that the non-static item has been used with.

13. The method of claim 1, wherein the renewing includes:
notifying the avatar of a purchase requirement in response to an expiration of a trial period of a "try before you buy" offer.

14. A system comprising:
at least one computing device configured to dynamically manage non-static items in an inventory in a virtual universe by performing a method, comprising:
providing at least one non-static item in the inventory of an avatar with metadata specifying that the non-static item must be renewed and the frequency of renewal, wherein the avatar is a graphical representation of a humanoid in the virtual universe, and wherein the non-static item is a virtual possession of the avatar;
obtaining instructions using the at least one computer hardware device regarding a renewal of the non-static item, wherein the non-static item is registered with a source of the non-static item and the non-static item contacts the source to obtain the instructions, wherein the source is a supplier/manufacturer within the virtual universe, wherein the virtual universe is an interactive simulated environment accessed by multiple users through an online interface;
sending a message regarding the renewal of the non-static item from the source to the non-static item; and
renewing the non-static item based on the instructions.

15. The system of claim 14, wherein the obtaining instructions further comprises:
querying the non-static item to audit a usage of the non-static item.

16. The system of claim 14, wherein the renewing the non-static item further comprises:
teleporting the avatar to a predetermined location in the virtual universe; and
renewing the non-static item at the predetermined location;
wherein the predetermined location comprises at least one of: a purchase location in the virtual universe; a landmark of the source of the non-static item in the virtual universe; or a region or island in the virtual universe.

17. The system of claim 14, wherein the renewing the non-static item further comprises:
paying a renewal fee.

18. The system of claim 14, the method further comprising:
providing a reminder regarding the renewal of the non-static item.

19. The system of claim 18, wherein the reminder further comprises at least one: of changing a graphical characteristic of the non-static item; or sending a teleport invitation from the source of the non-static item to the avatar.

20. The system of claim 14, the method further comprising:
providing non-static item renewal, update, and usage data for the non-static item.

21. The system of claim 20, wherein the non-static item renewal, update, and usage data comprises at least one of: how often the non-static item has been used or removed from the inventory; all locations in which the non-static item has been used; any modifications made to the non-static item; or other items in the inventory that the non-static item has been used with.

22. A program product stored on a computer readable storage medium, which when executed, dynamically manages non-static items in an inventory in a virtual universe, the computer readable storage medium comprising program code for:
provided at least one non-static item in the inventory of an avatar with metadata specifying that the non-static item must be renewed and the frequency of renewal, wherein the avatar is a graphical representation of a humanoid in the virtual universe, and wherein the non-static item is a virtual possession of the avatar;
obtaining instructions using the at least one computer hardware device regarding a renewal of the non-static item, wherein the non-static item is registered with a source of the non-static item and the non-static item contacts the source to obtain the instructions, wherein the source is a supplier/manufacturer within the virtual universe, wherein the virtual universe is an interactive simulated environment accessed by multiple users through an online interface;
sending a message regarding the renewal of the non-static item from the source to the non-static item; and
renewing the non-static item based on the instructions.

23. A method for deploying an application for dynamically managing non-static items in an inventory in a virtual universe, comprising:
providing a computer infrastructure including at least one computer device configured for:
providing at least one non-static item in the inventory of an avatar with metadata specifying that the non-static item must be renewed and the frequency of renewal, wherein the avatar is a graphical representation of a humanoid in the virtual universe, and wherein the non-static item is a virtual possession of the avatar;
obtaining instructions using the at least one computer hardware device regarding a renewal of the non-static item, wherein the non-static item is registered with a source of the non-static item and the non-static item contacts the source to obtain the instructions, wherein the source is a supplier/manufacturer within the virtual universe, wherein the virtual universe is an interactive simulated environment accessed by multiple users through an online interface;
sending a message regarding the renewal of the non-static item from the source to the non-static item; and
renewing the non-static item based on the instructions.

* * * * *